United States Patent [19]

Kasahara et al.

[11] 4,444,934

[45] Apr. 24, 1984

[54] HEAT RESISTANT THERMOPLASTICS RESIN COMPOSITION EXCELLENT IN PROCESSING FLOWABILITY

[75] Inventors: Hideo Kasahara, Yokohama; Yukihisa Mizutani, Kawasaki; Kunio Fukuda, Chigasaki, all of Japan

[73] Assignee: Asahi Kasei Kogyo Kabushiki Kaisha, Osaka, Japan

[21] Appl. No.: 446,027

[22] Filed: Dec. 1, 1982

[51] Int. Cl.³ .................. C08G 65/00; C08K 5/10; C08K 5/11
[52] U.S. Cl. ........................... 524/310; 523/455; 524/317; 524/611; 524/612
[58] Field of Search ............ 524/310, 317, 611, 612; 523/455

[56] References Cited

U.S. PATENT DOCUMENTS

| | | | |
|---|---|---|---|
| 3,792,121 | 2/1974 | Abolins et al. | 524/310 |
| 4,224,209 | 9/1980 | Cooper et al. | 524/141 |
| 4,363,891 | 12/1982 | Rosen et al. | 524/317 |
| 4,379,197 | 4/1983 | Cipriani et al. | 524/317 |
| 4,384,063 | 5/1983 | Luxon | 524/611 |

FOREIGN PATENT DOCUMENTS

| | | | |
|---|---|---|---|
| 261353 | 7/1963 | Australia | 524/310 |
| 42-3313 | 2/1967 | Japan | 524/310 |
| 49-5220 | 2/1974 | Japan . | |
| 49-11949 | 2/1974 | Japan | 524/611 |
| 49-23845 | 3/1974 | Japan . | |
| 49-55752 | 5/1974 | Japan | 524/611 |
| 52-90559 | 7/1977 | Japan . | |
| 52-90596 | 7/1977 | Japan . | |
| 53-41341 | 4/1978 | Japan | 524/317 |
| 55-118956 | 9/1980 | Japan . | |
| 1240220 | 7/1971 | United Kingdom | 524/611 |

*Primary Examiner*—Ronald W. Griffin
*Attorney, Agent, or Firm*—Armstrong, Nikaido, Marmelstein & Kubovcik

[57] ABSTRACT

A heat resistant thermoplastic resin composition improved in working fluidity while keeping the characteristics of aromatic polyether resins such as heat resistance and solvent cracking resistance. This composition comprises 100 parts by weight of an aromatic polyether resin or a mixed resin of an aromatic polyether resin and a styrene resin and 0.1 to 10 parts by weight of a polyhydric alcohol fatty acid ester having at least one —OH group. This ester preferably has a molecular weight of at least 200.

7 Claims, 3 Drawing Figures

(2-1)

(2-2)

(3-1)

(3-2)

HEAT RESISTANT THERMOPLASTICS RESIN COMPOSITION EXCELLENT IN PROCESSING FLOWABILITY

BACKGROUND OF THE INVENTION

This invention relates to a heat resistant thermoplastic resin compositions having good moldability. More particularly, it relates to resin compositions which comprise an aromatic polyether or a mixed resin of an aromatic polyether and a styrene resin (referred to as aromatic polyether resin hereinafter) and a fatty acid ester of polyhydric alcohols which has at least one —OH group.

Aromatic polyether resins have become noticeable as resins having wide uses because of their excellent mechanical properties, electrical characteristics and heat resistance with good dimensional stability. However, their serious defect is the low moldability.

U.S. Pat. No. 4,224,209, Japanese Patent Unexamined Publication (Kokai) No. 90559/77 and Japanese Patent Examined Publication (Kokoku) No. 5220/74 disclose the addition of plasticizers such as mineral oil, triphenyl phosphate, etc. to the aromatic polyether resins to solve said defect. However, when these plasticizers are added in an amount to give sufficient flowability for processing, heat resistance markedly decreases. Furthermore, Japanese Patent Unexamined Publications (Kokai) No. 79151/81 and No. 118956/80 disclose low molecular weight resinous materials such as low molecular weight polystyrene, coumarone-indene resin, polyterpene resin, modified rosin resin, etc. as additives which provide processing flowability without marked reduction of heat resistance. However, addition of these low molecular weight resinous materials to aromatic polyether resins results in much decrease of solvent cracking resistance (which means very easy cracking upon contact with chemicals). Besides, modified rosin resins are inferior in heat stability to cause discoloration.

The inventors have made intensive researches to improve processing flowability of aromatic polyether resins with no considerable decrease in their characteristics such as heat resistance, solvent cracking resistance, etc. As a result, it has been found that an especially preferred result is obtained with use of such compounds which are used as a lubricant or surfactant rather than as a plasticizer for aromatic polyether resins, namely, a fatty acid ester of polyhydric alcohols which has at least one —OH group.

BRIEF DESCRIPTION OF THE DRAWINGS

FIG. 2-1 is a plan view and FIG. 2-2 is a side view of the metal fitting fixture.

FIG. 3-1 is a plan view and FIG. 3-2 is a side view of the boss part.

DESCRIPTION OF THE INVENTION

Figure 1:
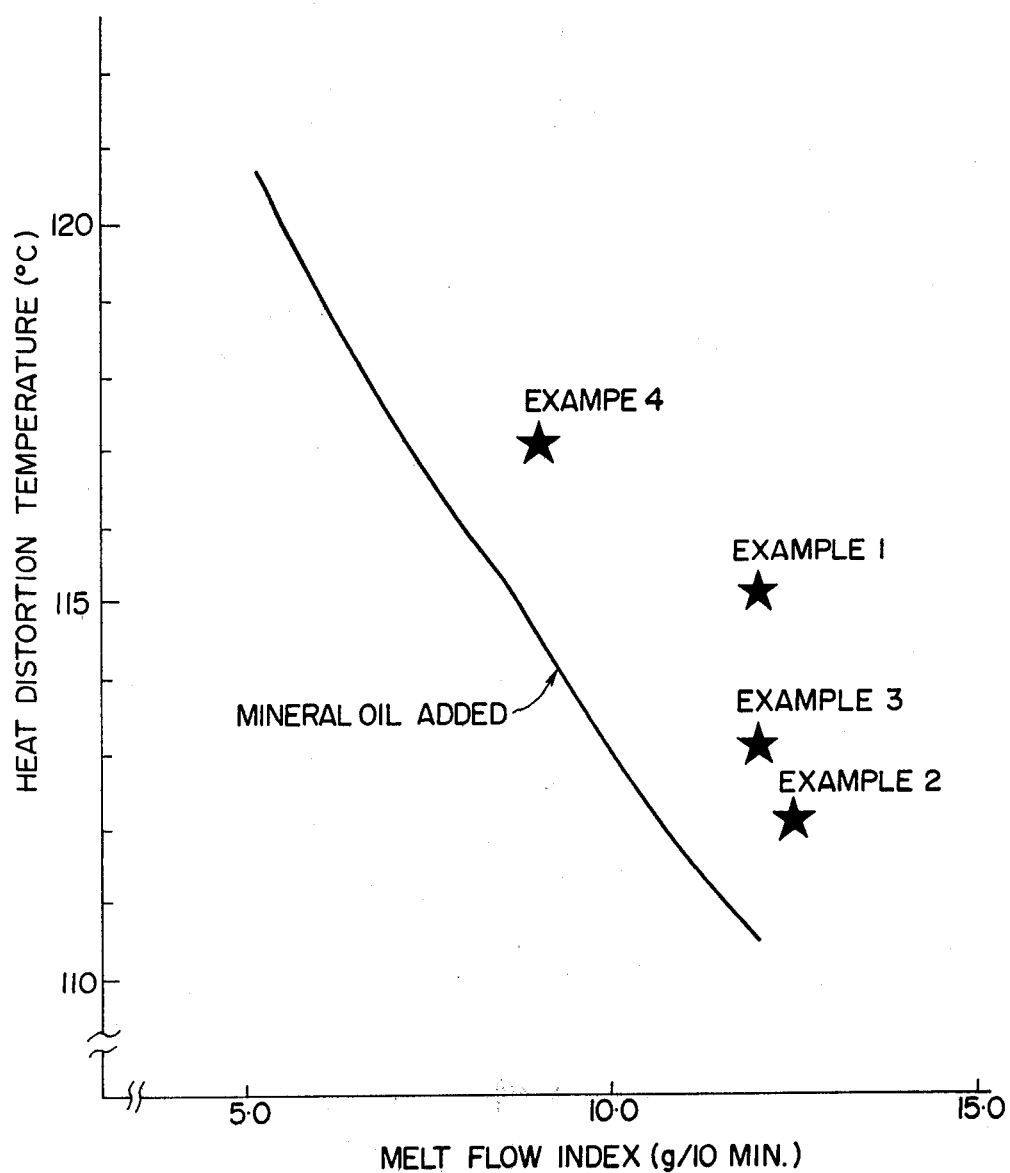
FIG. 1 shows relation between heat distortion temperature and melt flow index of the resin compositions of this invention, wherein the straight line indicates the relation when a mineral oil is added to the compositions.

The thermoplastic resin compositions of this invention are comprised of 100 parts by weight of an aromatic polyether or a mixed resin of an aromatic polyether and a styrene resin and 0.1 to 10 parts by weight of a compound which is a fatty acid ester of polyhydric alcohol which has at least one —OH group.

The aromatic polyether resins of this invention which are typically polyphenylene ether resins include homopolymers of the following repeating unit [I] and copolymers of the following repeating unit of [I] and [II] and graft copolymers obtained by grafting styrene, etc. on said polymers.

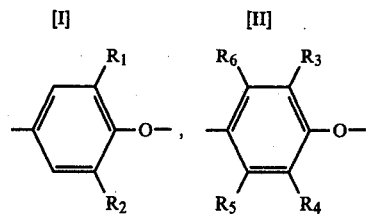

(wherein $R_1$, $R_2$, $R_3$, $R_4$, $R_5$ and $R_6$ which may be identical or different are monovalent residues such as alkyl groups of 1 to 4 carbon atoms except tert-butyl group, aryl groups, halogens, hydrogen, etc. and $R_5$ and $R_6$ cannot be simultaneously hydrogen).

Specific examples of polyphenylene ether homopolymers include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether, poly(2-methyl-6-chloroethyl-1,4-phenylene)ether, etc.

The polyphenylene ether copolymers include those which are mainly composed of polyphenylene ether structure which is obtained by copolymerizing the repeating unit [I] above with alkyl substituted phenols such as 2,3,6-trimethylphenol, etc. which are represented by the general formula:

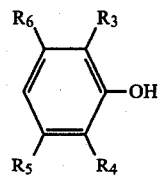

(wherein $R_3$, $R_4$, $R_5$ and $R_6$ are monovalent residues such as alkyl groups of 1 to 4 carbon atoms except tert-butyl group, aryl groups, halogens, hydrogen, etc. and $R_5$ and $R_6$ cannot be simultaneously hydrogen).

Furthermore, those which are obtained by graft-copolymerization of said polyphenylene ether with styrene alone or a monomer copolymerizable with styrene may also be used. As the monomers copolymerizable with styrene, there may be used, for example, α-methylstyrene, methylstyrene, dimethylstyrene, vinyltoluene, acrylonitrile, methacrylonitrile, acrylic acid, methacrylic acid and esters of methacrylic acid.

There is no limitation in the method for grafting these monomers on the polyphenylene ether, but there may be employed the method disclosed in Japanese Patent Examined Publications (Kokoku) No. 30991/77 and No. 38596/77 and Japanese Patent Unexamined Publication (Kokai) No. 142799/77 which comprises grafting with heat a styrene alone or said monomers on polyphenylene ether in the presence of a peroxide.

Furthermore, the polyphenylene ether resins used in this invention also include mixtures of said polyphenylene ether or polyphenylene ether graft copolymers with other resins such as styrenes resins, polycarbonates, polyamide, styrene-butadiene block copolymers, etc., among which styrene resins are preferred from the point of mechanical properties, etc.

The styrene resins used in this invention may be styrene copolymers containing at least 50% by weight of a styrene compound such as polystyrene, rubber-reinforced polystyrene, styrene-acrylonitrile copolymer, styrene-acrylonitrile-butadiene copolymer (ABS resin), styrene-methyl methacrylate copolymer, MBS resin, styrene-maleic anhydride copolymer, rubber-reinforced styrene-maleic anhydride copolymer, styrene-$\alpha$-methylstyrene copolymer, $\alpha$-methylstyrene-methyl methacrylate copolymer, etc. Especially preferred are impact resistant polystyrenes and the most preferred blending ratio is 20 to 80% by weight of polyphenylene ether and 80 to 20% by weight of impact resistant polystyrene.

The compounds used in this invention are fatty acid esters of polyhydric alcohols which have at least one —OH group, namely, compounds containing at least one —OH group and at least one fatty acid ester group in one molecule.

Preferably these compounds have a molecular weight of at least 200. When the molecular weight is too low, undesired phenomena such as silver streak occur in molded products.

Polyhydric alcohol components of the compounds include glycerine, neopentyl polyol dipentaerythritol, sorbitan, mannitol, ethylene glycol, diethylene glycol, trimethylene glycol, propylene glycol, 1,4-butanediol, etc. and fatty acids which constitute fatty acid ester components include stearic acid, oleic acid, pelargonic acid, capric acid, undecylic acid, lauric acid, tridecylic acid, myristic acid, pentadecylic acid, palmitic acid, heptadecylic acid, nonadecanoic acid, arachic acid, behenic acid, lignoceric acid, montanic acid, linolic acid, linolenic acid, ricinoleic acid, etc.

Of the combinations of said polyhydric alcohols and fatty acids, especially preferred compounds as additives in this invention are neopentyl polyol monostearate, neopentyl polyol monolaurate, neopentyl polyol monooleate, neopentyl polyol distearate, neopentyl polyol dioleate, neopentyl polyol dilaurate, neopentyl polyol tristearate, neopentyl polyol trilaurate, neopentyl polyol trioleate, glycerine stearate, glycerine oleate, glycerine ricinolate, glycerine monobehenate, sorbitan stearate, sorbitan oleate, sorbitan palmitate, sorbitan laurate, etc.

The mixing ratio of the aromatic polyether resin and the compound which is the additive is preferably within the range of 0.1 to 10 parts by weight of the additive per 100 parts by weight of the resin. When the amount of the additive is too large, heat resistance conspecuously decreases and when too small, the resin cannot have sufficient processing flowability.

This invention provides compositions which comprise a mixture of an aromatic polyether resin and at least one additive, which are never limited by the method of preparation. These methods include melt-mixing by extruder, roll mixer, Banbury mixer, kneader mixer, etc.

The resin compositions of this invention can also include reinforcing fillers such as glass fibers, carbon fibers, asbestos, wollastonite, calcium carbonate, talc, mica, zinc oxide, titanium oxide, potassium titanate, etc. These fillers are preferably used in the range of 1 to 50% by weight of the total composition.

The resin compositions of this invention can also include flame retardants. There may be used general flame retardants such as phosphorus compounds, e.g., triphenyl phosphate, halogen compounds, e.g., decabromodiphenyl oxide.

Furthermore, other additives such as coloring agent, stabilizers, etc. may be incorporated in the resin compositions. Moreover, other polymers, e.g., polyethylene, polypropylene, polyamide, polyester, etc. may also be incorporated in an amount not to damage the characteristics such as mechanical properties. Preferred amount of these resins is 20% by weight or less.

DESCRIPTION OF THE PREFERRED EMBODIMENTS

The following examples are set forth as further illustration of the invention and are not to be construed as limiting the invention thereto. "Part" in these examples means "part by weight."

EXAMPLES 1 TO 4

50 parts of poly(2,6-dimethylphenylene-1,4-ether) having an intrinsic viscosity of 0.54 dl/g measured at 30° C. in chloroform, 10 parts of styrene and 0.9 part of di-tert-butyl peroxide were mixed by Henschel mixer and graft polymerized under melt-mixing at 280° C. by a twin-screw extruder to obtain a styrene grafted aromatic polyether. 85 parts of thus obtained aromatic polyether, 15 parts of a graft copolymer obtained by graft polymerization of 60 parts of styrene on 40 parts of polybutadiene rubber latex of 0.3$\mu$ in mean particle size by emulsion polymerization method as a rubber-reinforced styrene resin, 3 parts of triphenyl phosphate and 2 parts of a compound as shown in Table 1 as an additive were homogeneously mixed by a blender. Then the mixture was melt-mixed at 280° C. by an extruder to obtain a resin composition. Melt flow index (at 250° C. and 21.6 kg load), minimum injection pressure required for obtaining injection-molded product, heat distortion temperature (JIS K 7207) and tensile strength (JIS K 7113) of the compositions are shown in Table 1.

COMPARATIVE EXAMPLE 1

A resin composition was prepared in the same manner as described in Example 1 except that a mineral oil (Smoil ® TS-260 manufactured by Matsumura Oil Co. Ltd.) was used as the additive. Properties of this composition are shown in Table 1. Furthermore, in the same manner, resin compositions were prepared with varying the amount of the mineral oil added and melt flow index and heat distortion temperature of these resin compositions were measured. Relation between heat distortion temperature and melt flow index is shown in FIG. 1. It is clear from these results that the resin compositions of this invention are excellent in the balance of heat resistance and processing flowability.

TABLE 1

| | Additive | Properties of resin compositions | | | |
|---|---|---|---|---|---|
| | | Melt flow index (g/10 min.) | Heat distortion temperature (°C.) | Tensile strength (kg/cm²) | Minimum injection pressure required for obtaining molded products (kg/cm²) |
| Control | None | 5.4 | 120 | 540 | 87 |
| Example 1 | Neopentyl polyol fatty acid ester (UNISTER ® H476D manufactured by Nippon Oil & Fats Co. Ltd.) | 12.0 | 115 | 510 | 69 |
| Example 2 | Polyoxyethylenesorbitan monostearate (Nonion ® ST-221 manufactured by Nippon Oil & Fats Co. Ltd.) | 12.5 | 112 | 510 | 67 |
| Example 3 | Glycerine monostearate (Rikemal ® RMS-100 manufactured by Riken Vitamin Co. Ltd.) | 12.0 | 113 | 530 | 68 |
| Example 4 | Sorbitan monostearate (Nonion ® SP60R manufactured by Nippon Oil & Fats Co. Ltd.) | 9.0 | 117 | 530 | 72 |
| Comparative Example 1 | Mineral oil (Smoil ® TS-260 manufactured by Matsumura Oil Co. Ltd.) | 7.9 | 116 | 510 | 75 |

EXAMPLES 5, 6 AND 7

85 parts of the styrene grafted aromatic polyether obtained in Example 1, 15 parts of the graft copolymer also obtained in Example 1, 3 parts of triphenyl phosphate and a compound shown in Table 2 as an additive were homogeneously mixed by a blender and then melt-mixed at 280° C. in an extruder to obtain resin composition. Properties of these resin compositions are shown in Table 2.

EXAMPLE 8

50 parts of poly(2,6-dimethylphenylene-1,4-ether) having an intrinsic viscosity of 0.65 dl/g measured at 30° C. in chloroform, 50 parts of an impact resistant polystyrene (polybutadiene content 10%, mean particle size of rubber 3.8μ) and 3 parts of neopentyl polyol fatty acid ester (UNISTER ® H476D manufactured by Nippon Oil & Fats Co., Ltd.) were homogeneously mixed by a blender and then melt-mixed at 300° C. in a twin-screw extruder to obtain a resin composition. Solvent cracking resistance as well as melt flow index, minimum injection pressure required for obtaining injection molded products, heat distortion temperature and tensile strength of the resin composition were measured. The results are shown in Table 3.

The solvent cracking resistance was measured in the following manner.

Figure 2:
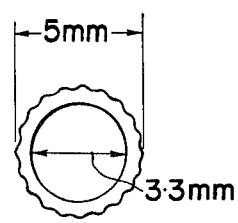
FIG. 2 shows an inserting metal fitting for measurement of solvent cracking resistance and the size thereof.
Figure 2:
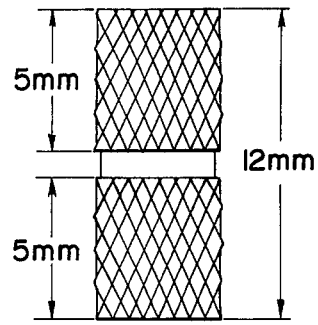
Figure 3:
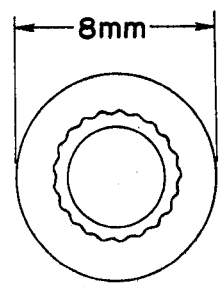
FIG. 3 shows a boss part of a resin molded product in which the inserting metal fitting of FIG. 2 is inserted and which is for estimation of solvent cracking resistance and the size of the boss part.
Figure 3:
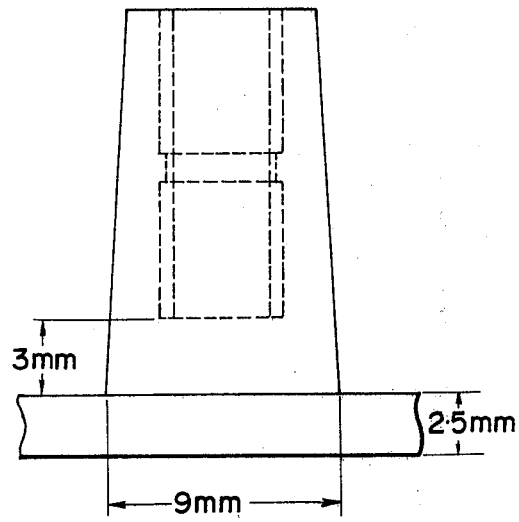

Solvent cracking resistance (insert breaking torque): An insert made of brass as shown in FIG. 2 the inside of which is threaded so as to fit with M-4 screw and the surface of which is knurled is insert-injection molded in a boss part as shown in FIG. 3. Then, the boss part is cut out, dipped in n-heptane at 23° C. for 10 minutes, then taken out and dried. There occur large cracks in the boss part which is inferior in solvent cracking resistance while substantially no cracks in the boss part which is superior in solvent cracking resistance. These results are quantitatively and numerically expressed by inserting an M-4 screw and measuring torque value required for breakage of the boss part by torque meter. That is, the boss part inferior in solvent cracking resistance which has already had cracks is broken at small torque value while that superior in solvent cracking resistance has a high torque value.

COMPARATIVE EXAMPLE 2

A resin composition was prepared in the same manner as in Example 8 except that the additive neopentyl polyol fatty acid ester was substituted with a petroleum resin [MITSUI PETROSIN ® #150 (softening point 150° C.) manufactured by Mitsui Petrochemical Industries Ltd.] and this was subjected to the same tests as in Example 8. The results are shown in Table 3. It is clear therefrom that use of petroleum resin as an additive results in much reduction in solvent cracking resistance.

TABLE 2

| | Additives | Properties of resin compositions | | | | |
|---|---|---|---|---|---|---|
| | | Amount | Melt flow index (g/10 min.) | Heat distortion temperature (°C.) | Tensile strength (kg/cm²) | Minimum injection pressure for obtaining molded products (Kg/cm²) |
| Example 5 | Neopentyl polyol fatty acid ester (UNISTER ® H476D | 1.0 part | 8.5 | 118 | 520 | 76 |

TABLE 2-continued

Properties of resin compositions

| | Additives | Amount | Melt flow index (g/10 min.) | Heat distortion temperature (°C.) | Tensile strength (kg/cm$^2$) | Minimum injection pressure for obtaining molded products (Kg/cm$^2$) |
|---|---|---|---|---|---|---|
| | manufactured by Nippon Oil & Fats Co., Ltd.) | | | | | |
| Example 6 | Neopentyl polyol fatty acid ester (UNISTER ® H476D manufactured by Nippon Oil & Fats Co., Ltd.) | 3.0 parts | 18 | 117 | 490 | 63 |
| Example 7 | Polyoxyethylenesorbitan monostearate (NONION ® ST-221 manufactured by Nippon Oil & Fats Co., Ltd.) | 1.0 part | 8.6 | 111 | 520 | 75 |

TABLE 3

Properties of resin compositions

| | Additives | Melt flow index (g/10 min.) | Heat distortion temperature (°C.) | Tensile strength (Kg/cm$^2$) | Minimum injection pressure for obtaining molded products (Kg/cm$^2$) | Solvent cracking resistance (insert breaking torque) (Kg-cm) |
|---|---|---|---|---|---|---|
| Example 8 | Neopenyl polyol fatty acid ester (UNISTER ® H476D manufactured by Nippon Oil & Fats Co., Ltd.) | 6.2 | 118 | 550 | 70 | at least 32 |
| Comparative Example 2 | Petroleum resin | 5.3 | 120 | 560 | 82 | 20 |

What is claimed is:

1. A thermoplastic resin composition which comprises (a) 100 parts by weight of a member selected from the group of an aromatic polyether and mixed resin comprising 20 to 80% by weight of an aromatic polyether and 80 to 20% by weight of a styrene resin and (b) 0.1 to 10 parts by weight of a compound which is a fatty acid ester of polyhydric alcohol which has at least one —OH group.

2. A thermoplastic resin composition according to claim 1 wherein the compound has a molecular weight of at least 200.

3. A thermoplastic resin composition according to claim 1 wherein the compound is a neopentyl polyol fatty acid ester.

4. A thermoplastic resin composition according to claim 1 wherein the compound is a glycerine fatty acid ester or sorbitan fatty acid ester.

5. A thermoplastic resin composition according to claim 1 wherein the composition includes a reinforcing filler.

6. A thermoplastic resin composition according to claim 1 wherein the composition includes a flame-retardant.

7. A thermoplastic resin composition according to claim 1, wherein the styrene resin is impact-resistant polystyrene.

* * * * *